UNITED STATES PATENT OFFICE.

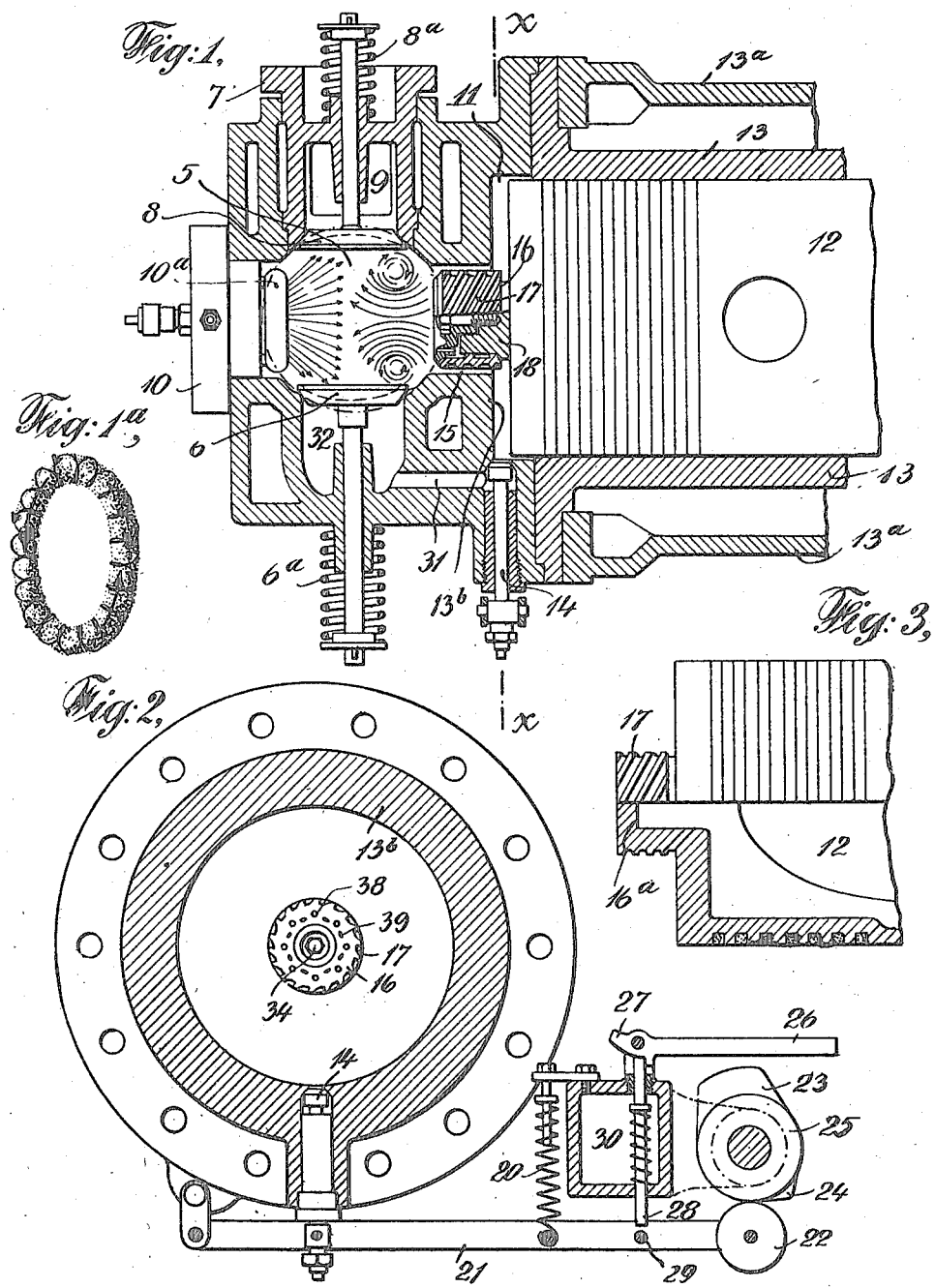

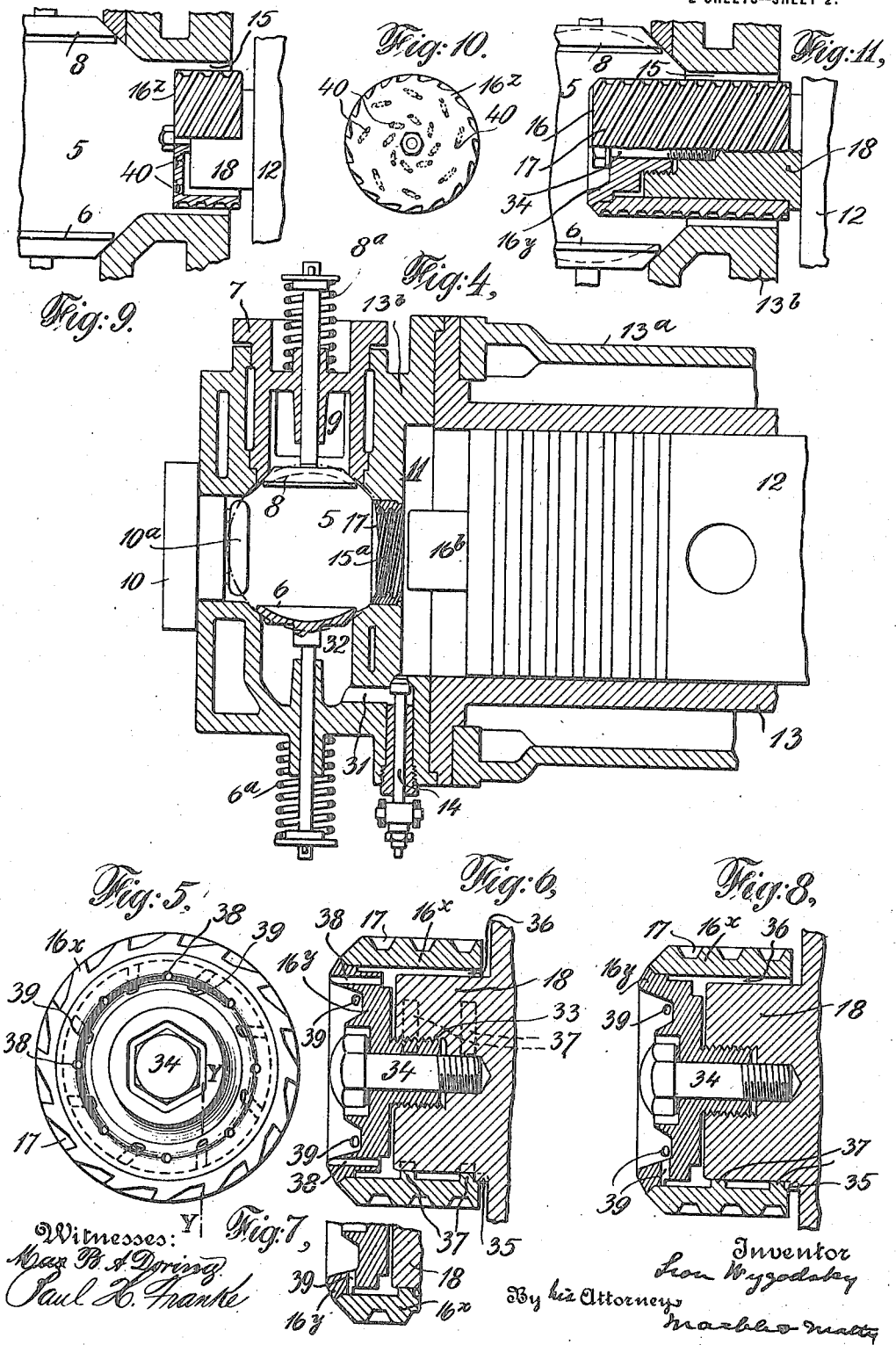

LEON WYGODSKY, OF NEW YORK, N. Y., ASSIGNOR, BY MESNE ASSIGNMENTS, TO BALTIMORE OIL ENGINE COMPANY, OF BALTIMORE, MARYLAND, A CORPORATION OF DELAWARE.

INTERNAL-COMBUSTION ENGINE AND PROCESS OF MIXING FUEL AND AIR AND PRODUCING COMBUSTION.

1,263,986.     Specification of Letters Patent.     Patented Apr. 23, 1918.

Application filed March 21, 1913. Serial No. 755,950.

*To all whom it may concern:*

Be it known that I, LEON WYGODSKY, a subject of the Czar of Russia, and a resident of New York, in the county of New York and State of New York, have invented certain new and useful Improvements in Internal-Combustion Engines and Processes of Mixing Fuel and Air and Producing Combustion, of which the following is a specification.

This invention relates to improvements in internal combustion engines, and particularly to improvements in engines designed to operate upon liquid fuel and in which the liquid fuel is sprayed into a combustion chamber communicating with but distinct from the engine cylinder; also to improvements in methods of mixing air and fuel and producing ignition and facilitating combustion in such engines. My invention comprises improvements in the form and construction of such combustion chamber and associated parts, improved means for causing efficient and rapid flow of air over the walls of that combustion chamber, and for thoroughly breaking up the injected oil and diffusing the same through the air, an improved method of mixing fuel and air in such engines and of producing ignition and efficient and rapid combustion, and other features hereinafter described and particularly pointed out in the appended claims.

The objects of my invention are, to improve the construction of internal combustion engines, particularly engines designed to operate upon more or less heavy liquid fuel; to increase the efficiency of such engines; to attain as complete combustion of the fuel as possible; to avoid accumulation of adhering tarry or coke-like deposits in such engines, and to provide for the efficient discharge of such material as may be deposited; to accomplish a very thorough mixture of the injected liquid fuel with the air; to permit the use of a substantially spherical combustion chamber, with valves of proper size, and to obtain in such a chamber a high compression pressure; and in general to produce an engine capable of operating efficiently on more or less heavy oils and like liquid fuels, and which is durable, reliable, easy to operate and free from unnecessary complication.

In a liquid fuel internal combustion engine, to obtain complete combustion of the fuel, it is necessary not only to vaporize the fuel but also to admix as far as possible every particle of fuel with a proportionate number of particles of air; in other words, the fuel must be evenly distributed or mixed in the mass of air in the combustion chamber. In internal combustion engines of the constant volume type wherein sufficient time for the formation of the combustible mixture is allowed, the diffusion of gases takes place in the course of a comparatively long period of time, *i. e.*, during the suction and the compression strokes of the engine; but in a constant pressure engine in which the fuel must necessarily be sprayed, vaporized, and mixed, at the end of the compression stroke, very little time is allowed for the perfect accomplishment of these three steps which are necessary for complete combustion. This is particularly difficult in case of heavy fuels, such as crude or residue oils, wherein owing to the heavy nature of their vapor, the coefficient of diffusion with air is very low. Owing to the high velocity of the liquid fuel when sprayed into the combustion chamber and also owing to the small dimensions of the latter, the particles of the fuel have a tendency to crowd against, and to condense on, the walls of the combustion chamber, and, to some extent, the effect of the spraying action is lost, or rendered largely ineffective. Only those particles of the fuel which were converted into vapor during their flight in the mass of the compressed air contribute to the formation of combustion mixture, the remainder of the particles being partly burned in the cylinder in the course of the expansion stroke (thus producing the so-called "after-burning" effect, *i. e.*, causing the expansion line of the power stroke to rise and approach the isothermic line,) or are condensed on the cold walls of the water jacketed parts of the engine, thus producing a sticky, tarry or dry carbonaceous deposit which has a tendency to interfere with the proper action of the piston or give a smoky exhaust.

According to my invention, to secure very thorough mixture of the air and fuel (the latter being usually oil), I preferably employ a combustion chamber of substantially spherical form, for the reasons hereinafter stated, this chamber communicating with the engine cylinder through a neck or passage of reduced diameter as compared with the diameter of the combustion chamber; and I spray the fuel into this combustion chamber from the rear side thereof, that is to say, from the side opposite the passage connecting said chamber with the engine cylinder, in the form of a widely divergent conical stream: and by the rearward motion of the piston I force air from the engine cylinder into the combustion chamber in the form of a corresponding but opposite conical stream, the air in this stream moreover rotating about the axis of the stream, and also having a vortex-ring motion, i e., a motion about an annular rearwardly traveling axis, as illustrated diagrammatically in Figures 1 and 1ª hereinafter referred to. The two conical streams, of fuel and air respectively, meet within the combustion chamber and as a result of their opposite motions, and of the complex motion of the air, mingle very thoroughly. When the motion of the piston is reversed and it begins its forward stroke, this mixture, usually already ignited, as a result of the high temperature existing within the combustion chamber, passes through the contracted passage connecting said combustion chamber and engine cylinder, into the engine cylinder; but during the first portion of the forward stroke of the piston the total cross sectional area of the said passage is not open but merely a narrow annulus forming the outer portion of said passage together with certain helical grooves. As a result of the passage of the mixed oil vapor, products of the early combustion, and air, through this narrow annular passage and through the said helical grooves, a further mixing of the air and combustible takes place and the gases passing are set into active rotation. As a result of these various actions, the oil is broken up into drops of extreme minuteness, completely surrounded by and in intimate contact with the air; which is a condition very favorable to complete and rapid combustion. Moreover, the walls of the said connecting passage, and the walls of the said helical groove, become highly heated during the operation of the engine, and by their heat, transmitted to a thin annular layer of mixed combustible and air, they insure complete vaporization and ignition of the combustible and help toward the attainment of complete and rapid combustion. It has been determined that the completeness of combustion of liquid fuel and rapidity of combustion are very greatly influenced by extremely fine subdivision of the liquid and by extremely thorough mixture of the liquid with air. These conditions are present to a high degree during the operation of my engine.

A concrete embodiment of the invention is illustratively exemplified in the accompanying drawings, wherein—

Fig. 1 is a cross section of a horizontal four cycle internal combustion engine at its breech end;

Fig. 1ª is a diagrammatic view illustrating the vortex-ring action occurring in the air current during the passage of such current into the combustion chamber.

Fig. 2 is a vertical section taken on the line X—X of Fig. 1;

Fig. 3 is a fragmentary, partly sectional view of an alternative form of piston;

Fig. 4 is a cross sectional view similar to Fig. 1 but illustrating a further alternative construction;

Figs. 5, 6 and 7 are detail views on a larger scale showing the construction of the piston-projection illustrated in Fig. 1, Fig. 5 being an end view of said piston-projection and Fig. 6 a central longitudinal section thereof, while Fig. 7 is a detail section of the line Y of Fig. 5.

Fig. 8 is a central longitudinal section of a piston projection, involving an alternative arrangement of air holes;

Fig. 9 is another longitudinal section of a piston projection, and part of the combustion chamber, illustrating a further alternative construction.

Fig. 10 shows an end view of the form of piston-projection shown in Fig. 9;

Fig. 11 shows a longitudinal section and partial elevation of an alternative form of piston projection, a portion of the combustion chamber being also shown in section.

Referring first to Figs. 1 and 2: 5 designates the combustion chamber, 13ª the engine-cylinder casing, and 13 a liner cylinder inserted within said casing and within which the piston 12 moves. This combustion chamber is preferably spherical, and is provided at its bottom with an exhaust valve 6 under the influence of a spring 6ª and at the top with a valve box 7 containing the air valve 8 and the air port 9, the valve being under the influence of the spring 8ª. The back of the combustion chamber contains a sprayer box 10 and ignition device 10ª of any desired approved construction for spraying the fuel. In my Patent No. 971,954, dated October 4, 1910, I illustrate one suitable form of spraying device, and in my Patent No. 1076619 dated Oct. 21, 1913, I illustrate one suitable form of ignition device. The piston side of the combustion chamber is extended to form the chamber 11, which is complemental to the engine cylinder and is of slightly longer diameter than said cylinder. This chamber 11 is provided for two objects, viz: (1) to do away with the shoulder generally formed in the liner 13, at the end of the piston path, through wear in the course of long work, and so to simplify the boring of the cylinder, and also (2) to provide space for an auxiliary exhaust, discharge and relief valve 14 (Figs. 1, 2 and 4) to be described below. The engine cylinder head 13$^b$ is further provided with a constricted neck 15 connecting the spherical combustion chamber 5 with the annular chamber 11 of the cylinder head. This neck 15 is formed to receive the projection 16 of the reciprocating piston 12. One of these elements, either the projection 16 of Fig. 1, or the projection 16$^a$ of Fig. 3, or the neck 15$^a$ (Fig. 4) is provided with spiral grooves 17 for the circulation of the air to be described below. In Figs. 1 and 2, the projection 16 is in the form of a loose cover fixed to the smaller projection 18 of the piston, and the space between the cover and the projection 18 is utilized to furnish channels to supply air to holes in the cover, as shown more clearly in Figs. 5, 6 and 7. In Fig. 3 the spiral grooves 17 are cut in the projection 16$^a$, which is an integral part of the casting of the piston body 12. In Fig. 4 the grooved neck 15$^a$ is in the shape of a loose ring, provided with internal spiral grooves and fixed in a corresponding socket in the neck part of the combustion chamber. The combination of the neck and the projection with the spiral grooves between them serves to set up (on the compression stroke) rotary currents of air to mix the spray with the air in a manner to be more fully described below.

At the bottom of the annular chamber 11 is situated the auxiliary valve 14 (Figs. 1, 2 and 4) which acts like a safety valve and is loaded by a spring 20 (Fig. 2) through a lever 21. The end of the lever 21 is provided with a roller 22, actuated by the bosses 23 and 24 of a cam 25. The valve 14 may be opened by means of the lever 26, provided with a cam portion 27, which cam through a push rod 28 and a stop 29 operates the valve lever 21. All these parts are mounted on the side shaft bracket 30, which is fixed to the engine bed (not shown). The discharge through the auxiliary valve 14 is directed through the passage 31 to the exhaust chamber 32 of the cylinder head.

The operation of the device is as follows:—During the rearward stroke of the piston air is forced by the piston through the neck 15 into the combustion chamber 5, this air stream necessarily taking the form of a divergent approximately conical stream, as illustrated diagrammatically by arrows in Fig. 1. Near the end of the compression stroke, and before the injection of the fuel takes place, the projection 16, on entering the neck 15 of the combustion chamber, closes the cylindrical part behind the piston from the spherical part of the combustion chamber. The remaining air behind the piston is forced with high velocity through the spiral grooves 17 between the projection 18 and the constricted neck, directing the air in the spherical combustion chamber 5 toward its walls and also forcing the air near the walls into high rotary motion, which motion will prevent any particle of fuel from settling down on the walls of the chamber; this whirling motion will further drive every particle of oil, injected by the spraying device 10 into the highly compressed air in the combustion chamber, at about this time, around the spherical walls until it is entirely converted into vapor, mixed with air, and in condition to be consumed.

Furthermore, the piston 12, in so forcing the air through the space between the neck 15 and piston projection 16, creates, in the air stream so forced into the combustion chamber, a vortex-ring action; that is to say, the air is forced into the combustion chamber, in large measure, in the form of an annulus, the air of which is rotating about the circular axis of that annulus, and also about the central axis of the stream, as indicated diagrammatically in Fig. 1$^a$. This vortex ring action obviously favors concentration of the most of the air near the walls of the combustion chamber, and favors very thorough mixture of the air with the oil sprayed into said combustion chamber. I have already stated that the action of the fuel spraying device has a tendency to concentrate the fuel close to the walls of the combustion chamber; it is very desirable therefore that the most of the air shall be correspondingly concentrated near said walls; and the above described vortex action, together with the rotary motion of the air about the axis of the combustion chamber, due to the jets of air projected angularly from the spiral grooves 17 and from the air holes 39 of the projection 16, produce a marked concentration of the air close to the walls of the combustion chamber. Furthermore, owing to the rapid rotary motion which the air within the combustion chamber has at this time, by reason of the swirling motion imparted to it during its passage through the grooves 17, and otherwise, any oil which may reach the walls of the combustion chamber, or the inner surfaces of the valves 6 and 8, will be swept therefrom and prevented from adhering thereto.

At a suitable point in the stroke of the piston, and when that piston has nearly reached the end of its rearward stroke, a stream of oil is injected, in the form of a conical spray, by sprayer 10, into the combustion chamber. This stream of oil meets the opposite conical stream of air forced by the piston into the combustion chamber and as a result of the meetings of these two streams and of the whirling motion of the air, and as a result of the fine subdivision of the oil particles due to the spraying action and due to the fact that this spray stream develops freely, there being no obstruction in its path, a very thorough and intimate mixture of air and oil particles is formed.

The shape of the combustion chamber has an important influence upon the motion of the air within said chamber; for it will be seen readily that if the combustion chamber were not of a shape to permit and to facilitate the rotary swirling of the air along its walls, this sweeping action of the swirling air current could not occur so effectively, and moreover, the swirling motion might be broken up. The spherical form of combustion chamber is the form which interferes least with the swirling motion of the air currents.

When the forward stroke of the piston begins the particles of air and fuel will necessarily change their direction of motion on entering the air grooves to pass into the cylinder. This results in a further swirling motion of the air and fuel during its passage through such air grooves, and after its entrance into the chamber 11 and into the cylinder, the effect of which is to further break up particles of liquid fuel not already consumed, and to thoroughly mingle the air and the fuel, thus greatly facilitating the thorough combustion of the fuel and materially increasing the rate of combustion, and, because of the thorough mixture of the air with the fuel, making practically complete combustion possible without the enormous excess of air over that theoretically required for combustion, which must be used in most former engines. The walls of the air grooves will become red hot in the course of the action of the engine and this will help to heat up the passing air and also to further vaporize the fuel. In case the latter action is required to be enhanced the construction shown in Figs. 1 and 5-10 inclusive is preferable, in which construction, the loose cover 16 is encircled by the burning gases both from within and without and having small contact with the cool portions of the piston, will in a short time be brought to red heat and then will act as a surface vaporizer.

The piston projection 16$^a$ shown in Fig. 3 is a simplified construction without a cover. In the alternative construction shown in Fig. 4 the projection 16$^b$ on the piston is plain but the grooves are in the inner surface of a loose ring 15$^a$ fixed in the neck of the combustion space. This arrangement permits the air, after the projection 16$^b$ passes the comparatively small width of the neck, to issue from the same point of the air grooves into the spherical portion of the combustion chambers. There is very little difference in the various constructions shown and the principle is practically the same.

One important advantage of the use of a piston projection, such as 16, working within a narrow throat connecting the combustion chamber and engine cylinder is, that thereby the shock on the piston and other running parts of the engine, due to sudden ignition in the combustion chamber of the oil sprayed therein, is reduced to a negligible degree. Commonly, in the case of heavy oil engines, in which oil is injected into the combustion chamber or end of the cylinder, ignition takes place very suddenly, producing excessive shocks upon the piston, connecting rod, crank shaft, etc., as a result of which these engines have usually been made of very massive construction. But in my engine, the force of the explosion in the combustion chamber is exerted almost entirely, at first, upon the relatively small piston projection 16; and because this piston projection has a relatively small area, as compared with the area of the piston, the effect of even a violent explosion on this piston projection is insignificant; and moreover, the grooves 17 relieve the pressure due to such explosion instantly, since the gases flow through said grooves into the cylinder and act against the piston itself. For this reason my engine may be of relatively light construction, as compared with many former heavy oil engines in which the oil is injected into the cylinder of the combustion chamber.

It has long been recognized that the spherical form of the combustion chamber is the preferable form; but heretofore it has been practically impossible to employ a spherical combustion chamber, in engines operating with from moderate to high compression pressures, and in which the combustion chamber is provided with admission and exhaust valves of adequate size; for if said admission and exhaust valves be of a size which is adequate, they compel the use of a combustion chamber, if the latter be of spherical form, of such size that its volume is too great to permit the desired compression pressures to be obtained. But in my engine the piston projection occupies, at the end of the compression stroke, a very considerable portion of the total volume of the clearance space (the clearance space including the compression chamber, the portion of the cylinder between the end of the piston and the cylinder head, and the neck connecting the combustion chamber and cylinder) and for that reason higher compression pressures are obtaining in my engine than in engines which, though provided with spherical combustion chambers, are not provided with piston projections. Moreover, and as illustrated in Fig. 11, the piston projection may extend backward nearly to the ignition device 10ª, when the piston is at the rear end of its stroke. So much of the combustion chamber may be occupied in this manner, that practically any desirable compression pressure may be obtained, in a spherical combustion chamber having admission and exhaust valves of adequate size.

The admission and exhaust valves may themselves be dished or recessed in order that they may not constitute chords of the spherical combustion chamber. This I have illustrated in Fig. 4, wherein the exhaust valve is shown as so dished, and the valve 8 of Fig. 4, and the valves 6 and 8 of Fig. 1, may be understood to be dished correspondingly.

In Figs. 5-8 inclusive I have illustrated preferred constructions of the piston projection. Referring first to Figs. 5, 6 and 7, 18 designates the piston projection proper, on which is fitted a cap comprising a helically grooved side member $16^x$ and an end piece $16^y$, the parts $16^x$ and $16^y$ being held to the piston in that part $16^y$ engages part $16^x$ as shown, and is provided with a screw boss 33 screwing into a corresponding recess of the piston projection 18, and is also provided with a screw stud 34 screwing into said piston projection 18. The piston may be provided with one or more lugs 35 limiting axial motion of the cap member $16^x$, while preserving a free air passage 36. The member $16^x$, is provided internally with interrupted lugs 37 spacing said member away from piston projection 18. Suitable ports or air holes may be provided in members $16^y$, and various arrangements of these air holes may be employed as may be found desirable under varying conditions. In the arrangement shown in Figs. 5, 6 and 7, the member $16^y$ is provided with longitudinal air holes 38 and with other air holes 39 arranged at an angle to the radius. In the arrangement shown in Fig. 8 the longitudinal air holes 38 are omitted. In the arrangement shown in Figs. 9 and 10 (which also shows a simplified form of cap designated by reference character $16^z$) two rows of angularly arranged holes 40 directed in opposite directions, are shown.

What I claim is:—

1. An internal combustion engine comprising in combination a cylinder, a combustion chamber provided with air admission and exhaust valves forming when closed portions of the walls of that chamber, said combustion chamber having, internally, approximately the form of a body of rotation, and a passage connecting said cylinder and chamber, a piston in said cylinder provided with a projection adapted to enter said passage as the piston nears the rear end of its stroke, past which projection air will be forced by the piston into the combustion chamber, and means for imparting to the current of air forced by said piston from said cylinder through such passage into said combustion chamber, a whirling motion about the axis of such current.

2. An internal combustion engine comprising in combination a cylinder, a combustion chamber provided with air admission and exhaust valves forming when closed portions of the walls of that chamber, said combustion chamber being internally, of approximately spherical form, and a passage connecting said cylinder and chamber, a piston in said cylinder provided with a projection adapted to enter said passage as the piston nears the rear end of its stroke, past which projection air will be forced by the piston into the combustion chamber, and means for imparting to the current of air forced by said piston from said cylinder through such passage into said combustion chamber, a whirling motion about the axis of such passage.

3. An internal combustion engine comprising in combination an engine cylinder, a combustion chamber, a passage connecting said cylinder and combustion chamber, a piston in said cylinder provided with an air guide having one or more curved grooves arranged to impart rotary motion to air or gas passing through said passage into the combustion chamber.

4. An internal combustion engine comprising in combination an engine cylinder, a combustion chamber, a passage connecting said cylinder and combustion chamber, a piston in said cylinder having a projection adapted to enter said passage, one or more curved air grooves being provided which induce rotary motion in the air or gas current passing through said passage into the combustion chamber.

5. An internal combustion engine comprising in combination an engine cylinder, a combustion chamber, a passage connecting said cylinder and combustion chamber, and a piston in said cylinder having a projection adapted to enter said passage, said projection being provided with one or more curved grooves arranged to impart rotary motion to air or gas passing through said passage into the combustion chamber.

6. An internal combustion engine comprising in combination an engine cylinder, a combustion chamber and a passage connecting said cylinder and chamber, said chamber being of approximately spherical form and provided at top and bottom with valves for inlet and exhaust, said chamber further provided with means for injecting a divergent stream of fuel into said chamber, and means for imparting rotary motion to air or gas passing through said passage, and means for imparting rotary motion to air or gas passing through said passage into the combustion chamber.

7. An internal combustion engine comprising in combination an engine cylinder, a combustion chamber and a passage connecting said cylinder and chamber, said chamber being of approximately spherical form and provided at top and bottom with valves for inlet and exhaust, said chamber further provided with means for injecting a divergent stream of fuel into said chamber, a piston in said cylinder provided with a projection adapted to enter said passage as the piston nears the rear end of its stroke, past which projection air will be forced by the piston into the combustion chamber, and means for imparting rotary motion to air or gas caused by said piston to flow through said passage.

8. An internal combustion engine comprising in combination an engine cylinder, a combustion chamber and a passage connecting said cylinder and chamber, said chamber being of approximately spherical form and provided at top and bottom with valves for inlet and exhaust, said chamber further provided with means for injecting a divergent stream of fuel into said chamber, a piston in said cylinder provided with a projection adapted to enter said passage as the piston nears the rear end of its stroke, past which projection air will be forced by the piston into the combustion chamber, and means for imparting rotary motion to air or gas caused by said piston to flow through the space between said projection and the walls of said passage.

9. An internal combustion engine comprising in combination an engine cylinder, a combustion chamber connected therewith through a restricted passage and a piston in said cylinder and provided with a projection adapted to enter the said restricted passage, and past which projection air or gas will be forced by the piston near the end of the rearward stroke thereof, said piston provided with means adapted to force air from the cylinder through said passage into the combustion chamber and to produce in the air so forced into the combustion chamber vortex-ring circulation combined with rotation of the vortex-ring as a whole.

10. An internal combustion engine comprising in combination an engine cylinder, a combustion chamber connected therewith through a restricted passage and having, internally, approximately the form of a body of rotation, and a piston within said cylinder provided with a projection adapted to enter the said restricted passage and past which projection air or gas will be forced by the piston near the end of the rearward stroke thereof, said piston adapted to force air from the cylinder through said passage into the combustion chamber and provided with means to produce in the air so forced into the combustion chamber, vortex-ring circulation combined with rotation of the vortex-ring as a whole.

11. An internal combustion engine comprising in combination an engine cylinder, a combustion chamber connected with said engine cylinder by a restricted axial passage, and a piston in said cylinder provided with an axial projection adapted to enter said passage, said projection provided with internal air passages connecting the cylinder and combustion chamber and through which air is forced by the piston into the combustion chamber.

12. An internal combustion engine comprising in combination an engine cylinder, a combustion chamber connected with said engine cylinder by a restricted passage, and a piston in said cylinder provided with a projection adapted to enter said passage, said projection provided with internal air passages connecting the cylinder and combustion chamber and through which air is forced by the piston into the combustion chamber, said passages being directed non-radially to produce rotary circulation of the air so forced into the combustion chamber.

13. An internal combustion engine comprising in combination an engine cylinder, a combustion chamber communicating with said cylinder through a restricted passage, a piston in said cylinder and a projection at the rear of the piston adapted to enter said passage and comprising a hollow cylinder, an end piece therefor, and means for securing said hollow cylinder and end piece to the piston.

14. An internal combustion engine comprising in combination an engine cylinder, a combustion chamber communicating with said cylinder through a restricted passage, a piston in said cylinder and a projection at the rear of the piston adapted to enter said passage and comprising a hollow cylinder, an end piece therefor, and means for securing said hollow cylinder and end piece to the piston, said end piece provided with air ports.

15. An engine piston provided at its rear end with a projection of smaller diameter than the piston, and a cover fitting over said projection and secured thereto, there being an air space between the interior of said cover and the sides of said projection, and the cover having air outlet openings in its end.

16. An engine piston provided at its rear end with a projection of smaller diameter than the piston, and a cover fitting over said projection and secured thereto, there being an air space between the interior of said cover and the sides of said projection, and the cover having air outlet openings in its end arranged at an angle to the radius.

17. An internal combustion engine comprising in combination a combustion chamber, means for forcing air from said cylinder into said combustion chamber and for producing rotary motion of such air current, and means for projecting into such combustion chamber and into the air so forced into such combustion chamber a divergent stream of fuel, the direction of entry of such fuel into such combustion chamber being substantially opposite that of the direction of flow of such air into such combustion chamber, conflict and thorough mixing of the fuel and air streams being thereby produced.

18. An internal combustion engine comprising in combination a combustion chamber, means for forcing air from said cylinder into said combustion chamber and for producing vortex ring circulation in such air current, and means for projecting into such combustion chamber and into the air so forced into such combustion chamber a divergent stream of fuel, the direction of entry of such fuel into such combustion chamber being substantially opposite that of the direction of flow of such air into such combustion chamber, conflict and thorough mixing of the fuel and air streams being thereby produced.

19. An internal combustion engine comprising a combustion chamber, means for forcing air into said combustion chamber in the form of a flaring stream and for producing rotary motion of such air current, means for projecting into such combustion chamber and into the air so forced into such combustion chamber a divergent stream of fuel, the direction of entry of such fuel into such combustion chamber being substantially opposite that of the direction of flow of such air into such combustion chamber, conflict and thorough mixing of the fuel and air streams being thereby produced.

20. The herein described method of mixing fuel and air and producing combustion in internal combustion engines, which comprises forcing air in the form of a flaring rotating stream into a heated combustion space, injecting fuel into such air stream in a direction substantially opposite that of introduction of the air, and causing the fuel to mix with said air stream and to ignite.

21. The herein described method of mixing fuel and air and producing combustion in internal combustion engines, which comprises forcing air in the form of a flaring rotating stream into a heated combustion space, injecting fuel into such air stream in the form of a flaring stream and in a direction substantially opposite to that of the flow of such air in said chamber, and causing the fuel to mix with said air stream and to ignite.

22. The herein described method of mixing fuel and air and producing combustion in internal combustion engines, which comprises forcing air in the form of a flaring rotating stream into a heated combustion space, injecting fuel into such air stream in a direction substantially opposite the direction of flow of such air stream and causing the fuel to mix with said air stream and to ignite, and causing the resulting mixture to flow out of said combustion chamber in the opposite direction and passing such outflowing mixture through narrow highly heated passages.

In testimony whereof I have signed this specification in the presence of two subscribing witnesses.

LEON WYGODSKY.

Witnesses:
 H. M. MARBLE,
 PAUL H. FRANKE.